(No Model.)

W. G. RUGE & O. EVERTZ.
HORSE COLLAR.

No. 336,869. Patented Feb. 23, 1886.

Attest:
Joseph Wachtel

Inventor:
William G. Ruge and
Otto Evertz.
per Schalff Meisner.
Attorney

UNITED STATES PATENT OFFICE.

WILLIAM G. RUGE AND OTTO EVERTZ, OF WASHINGTON, MISSOURI.

HORSE-COLLAR.

SPECIFICATION forming part of Letters Patent No. 336,869, dated February 23, 1886.

Application filed August 7, 1885. Serial No. 173,842. (No model.)

*To all whom it may concern:*

Be it known that we, WILLIAM G. RUGE and OTTO EVERTZ, both citizens of the United States, and both residing at Washington, in the county of Franklin and State of Missouri, have invented certain new and useful Improvements in Horse-Collars, of which the following is a specification.

Heretofore in the construction of horse-collars it has been the common practice to use long straw for the body or main portion of the filling, and to face the same next the casing with cut straw, wool, hair, and similar material, by which means a cheap collar of stout body and cushioned or yielding bearing-surface was obtained. The objection to this construction, however, consisted in this, that the facing of cut straw, wool, &c., had a tendency to absorb moisture, pack, become hard and knotty, overheat and chafe the skin of the animal, so that shortly supplemental pads became necessary to protect the animal. To overcome these difficulties it has been proposed to stuff the whole casing or collar with cork and granulated cork combined with gum-elastic or equivalent cement, which should bind the granulated cork into a homogeneous mass after its insertion into the collar. This latter filling for the collars has the advantage over the cut-straw and wool stuffing in this, that it renders the collar lighter, less liable to absorb moisture, and also less liable to become packed and knotty; but it has its disadvantages in rendering the collar less stable and firm, much too compressible and resilient, and considerably more expensive than the straw-stuffed collar.

The object of the present invention is to construct a collar which shall have the stability or firmness of the first-recited or common straw-stuffed collar, which renders it such a favorite, combined with the non-absorbing, non-packing, non-heating, and non-irritating qualities so desirable in the cork-stuffed collar.

To this end it consists in combining in a horse-collar a main body or backing of straw or like material with a facing of granulated cork.

I wish it distinctly understood that I do not broadly claim cork or a homogeneous mass of granulated cork united by elastic gum or cement as a filling for horse-collars.

With the above indication of the general scope of my invention, I will now describe more specifically the best method known to me of applying the invention, for which purpose reference is made to the accompanying drawings, wherein—

Figure 1:
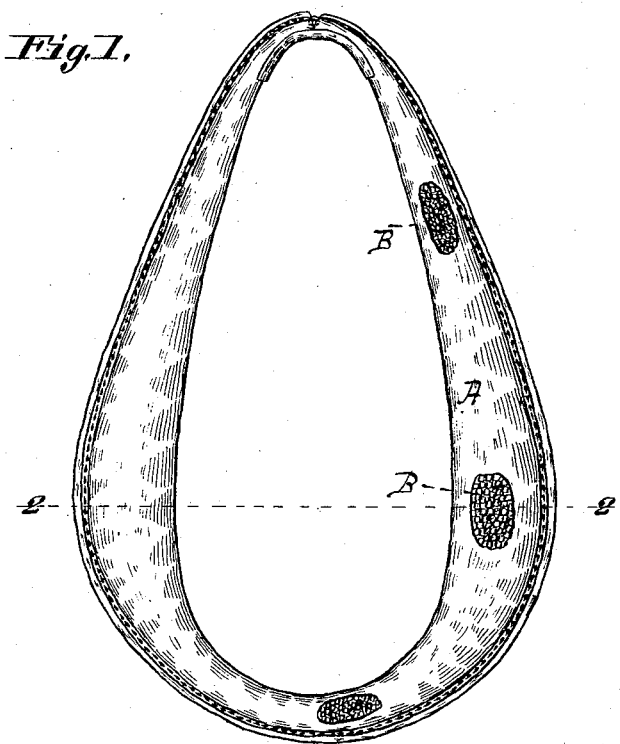
Figure 2:
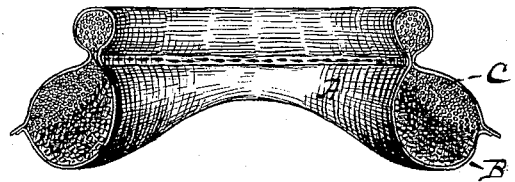

Figure 1 is a rear view of the collar with parts of the casing cut out to show the granulated-cork facing. Fig. 2 is a section on the line 2 2, Fig. 1.

Like letters refer to like parts wherever they occur.

A indicates the casing of the collar, which may be made of leather, or such other suitable material as is usually employed for like purposes. Within the casing, next to such portions thereof as will come in contact with the animal, is arranged a facing, B, of cork, preferably loose, dry, granulated cork, of such thickness as will give the desired cushioning or resiliency to the collar, and this facing B is then backed up and the stuffing of the collar completed by a backing, C, of straw or like material, which, while somewhat yielding, will give body stability or firmness to the collar, and tend to preserve its form or contour.

It will be evident that while the loose, dry, granular cork facing will adapt itself or conform to the shape of the animal so as to render the collar comfortable and easy to the animal, such facing will not absorb moisture or pack, while if such facing is backed up by straw, hay, tow, or any similar substance, which has little resiliency, has a tendency to pack, and which will not shift about, the form and stability of the collar will be preserved, without materially adding to the cost of manufacture, all of which is novel and very material.

Having thus set forth the nature, characteristic features, and advantages of our invention, and specifically pointed out what we consider as the best manner of applying the invention, what we claim as our invention, and desire to secure by Letters Patent, is—

A horse-collar or like article having a casing or cover, a resilient facing of granulated cork, and a firm or stable backing of straw or like material, substantially as and for the purposes specified.

WILLIAM G. RUGE.
OTTO EVERTZ.

Witnesses:
RUDOLPH HIRZEL,
E. GISSEL.